United States Patent [19]

Odoni et al.

[11] Patent Number: 5,308,973
[45] Date of Patent: May 3, 1994

[54] METHOD AND DEVICE FOR THE MEASUREMENT OF FORCE BY A FIBER OPTICS SYSTEM BY EVALUATING PHASE SHIFT OF LIGHT WAVES

[75] Inventors: Walter Odoni, Schaan, Liechtenstein; René Dändliker, Neuchâtel, Switzerland; Hanspeter Schad, Grabs, Switzerland; Edwin Schweizer, Sevelen, Switzerland

[73] Assignee: Hilti Aktiengesellschaft, Furstentum, Liechtenstein

[21] Appl. No.: 795,725

[22] Filed: Nov. 21, 1991

[30] Foreign Application Priority Data

Nov. 22, 1990 [DE] Fed. Rep. of Germany ....... 4037077

[51] Int. Cl.[5] .............................................. H01J 5/16
[52] U.S. Cl. ........................ 250/227.17; 250/227.19; 73/800
[58] Field of Search .............. 250/225, 227.15, 227.16, 250/227.17, 227.19, 227.21, 227.27, 231.19; 73/800

[56] References Cited

U.S. PATENT DOCUMENTS

| | | | |
|---|---|---|---|
| 4,652,129 | 3/1987 | Martinelli | 250/227.19 |
| 4,880,970 | 11/1989 | Jones | 250/227.16 |
| 4,884,434 | 12/1989 | Satake et al. | 250/227.15 |
| 4,904,050 | 2/1990 | Dunn et al. | 250/227.19 |
| 4,904,863 | 2/1990 | McDearmon | 250/227.17 |
| 5,061,847 | 10/1991 | Hazan et al. | 250/227.17 |
| 5,072,113 | 12/1991 | Martinelli et al. | 250/227.16 |

Primary Examiner—David C. Nelms
Assistant Examiner—Stephone B. Allen
Attorney, Agent, or Firm—Anderson Kill Olick & Oshinsky

[57] ABSTRACT

A method and the device for fiber-optic measurement of the absolute value of the pretensioning in a highly loaded mechanical structural component part are based on the measurement of the phase displacement of a light wave caused by the strain-induced birefringence in a single-mode light waveguide 4 which is embedded between two metallic disks or washers 3a, 3b. Since the measurement results are ambiguous modulo-$2\pi$, serial or simultaneous measurement with two light wavelengths $\lambda_1$, $\lambda_2$ is used according to a first method variant of the invention. The quantity of $2\pi$ periods can be unequivocally determined within a predetermined measuring range by means of comparing the two measurement results. The evaluation is preferably effected according to a quadrature or phase step method, known per se. According to second method variant, the light waveguide 4 is irradiated with polarized white light. The phase difference of the two linear modes due to the influence of force on the structural component part is compensated for in a compensation device 20. The control signal required for the compensation of the path difference is evaluated as a measurement for the force. The compensation method has the advantage that no monochromatic light sources are required.

24 Claims, 8 Drawing Sheets

Fig. 7 WHITE LIGHT POLARIMETER, LED

Fig. 8 WHITE LIGHT POLARIMETER, HALOGEN

Fig. 9  WHITE LIGHT POLARIMETER

Fig. 10

METHOD AND DEVICE FOR THE MEASUREMENT OF FORCE BY A FIBER OPTICS SYSTEM BY EVALUATING PHASE SHIFT OF LIGHT WAVES

The invention is directed to a method for the fiber-optic measurement of force based on the strain-induced change in birefringence of a single-mode light waveguide. The subject matter of the invention is further a device for the measurement by fiber optics of the absolute value of the pretensioning in a mechanical structural component part which is highly loaded by tensile or compressive forces.

BACKGROUND OF THE INVENTION

There are many mechanical structural component parts which must absorb high compressive or tensile forces over long periods of time in a pretensioned state, such as cables, bars, wires and screws. A heavy-duty dowel or bolt, for example, is a structural component part of this kind. Knowledge about the pretensioning in such a dowel is important for achieving controlled conditions in fastening. Dowels which are anchored and pretensioned in concrete in a friction-locking manner can relax with respect to this pretensioning as a result of aging and corrosion of the concrete.

Figures 1, 2:
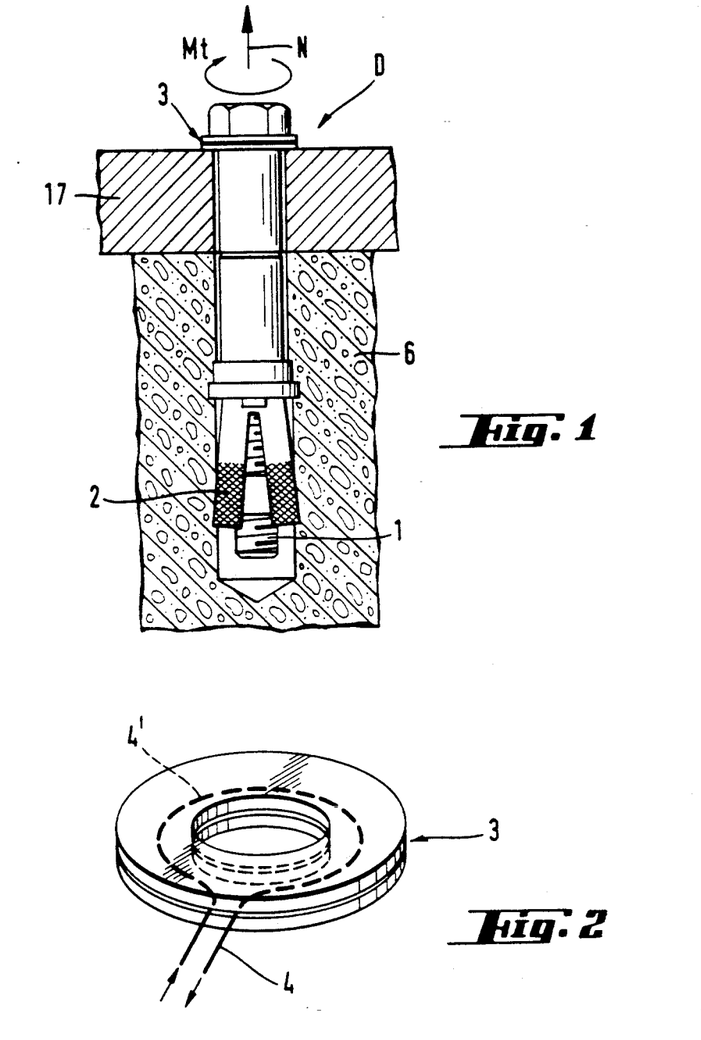
FIG. 1 shows a heavy-duty dowel as an example for a highly loaded mechanical structural component element.
FIG. 2 is a sketch explaining the principle of the invention.

At present, an indirect method is most often used for determining the pretensioning, namely measurement via torque. In principle, corrective measures can be taken by monitoring the torque of an expanding screw 1 and by after-expansion of the expanding element 2, as is illustrated by FIG. 1. However, undefined frictional influences (static or sliding friction) prevent a defined adjustment of the pretensioning already when setting the dowel D. But the torque is also not an unequivocal function of pretensioning and can only be measured when tightening, i.e. setting, the dowel D.

An automatic after-expansion and/or a permanent monitoring would also be desirable already when setting the dowel, particularly in safety-related applications. For this purpose a force sensor must be integrated in the structural component part, e.g. the dowel. Piezoelectric systems (quartz force measurement rings) and systems with strain gauges (DSM), e.g. in the form of weighing cells or as annular force transducers are known as such force sensors. However, apart from the high price, such direct measuring instruments for determining pretensioning generally have the disadvantage of an excessively large structural shape for many cases of application. Moreover, the quartz sensor is suitable only for dynamic measurements.

Indirect methods based, for example, on the change in length of the pretensioned threaded rod of the dowel which can be detected e.g. with ultrasonic transit time measurement, are also known. However, this method requires that the dowel be self-calibrating and that its data be recorded.

SUMMARY OF THE INVENTION

Accordingly, the principal object of the invention is to develop a measuring method and a comparatively inexpensive force sensor suitable for measuring the absolute value of the forces occurring in a highly loaded mechanical structural component part in a continuous manner or as required.

Investigations into the various possibilities for a promising solution are also concerned with the measurement of force by fiber optics based on the strain-induced birefringence of a single-mode light waveguide (hereinafter LWL). Fundamental findings for this kind of force measurement are extensively described in the references [1] to [3] (see appendix). However, the previously known measuring methods for evaluating the straininduced birefringence in a LWL are unsuitable for the desired measurement of absolute values, since they are ambiguous modulo $2\pi$.

The invention includes two fundamental methods and force measurement devices for the absolute, i.e. not modulo-$2\pi$- ambiguous, determination of the birefringence of a LWL induced by the mechanical force in a loaded structural component element. One is based on the kind of measurement of force described in the aforementioned references, but with the addition, substantial to the invention, that two wavelengths are used simultaneously or sequentially in order to eliminate the modulo-$2\pi$ ambiguity, as will be explained extensively hereinafter. The second method variant according to the invention is a compensation method in which the phase and path difference of the two linear modes caused by the birefringence in the LWL is compensated for by a Michelson interferometer. A possibly incoherent light source, i.e. not a monochromatic light source, such as a laser diode is used and so-called coherence detection is utilized for the evaluation of the signal.

The method of the type mentioned in the beginning for the measurement of force by fiber optics, according to the invention, is characterized according to the first solution variant in that, in order to achieve unequivocal measurement results, i.e. absolute measurement, two light waves having different wavelengths are beamed into one end of the light waveguide and the phase difference of the two linear modes of the light waves exiting at the other end of the light waveguide caused by the force acting on the light waveguide and by the consequent change in birefringence is determined and evaluated as a measurement for the force.

A device for the fiber-optic measurement of the absolute value of the pretensioning in a mechanical structural component part which is highly loaded by tensile or compressive forces in which the method is used in the defined manner is distinguished, according to the invention, in that the optical fiber LWL is embedded along a partial area of its length lying between its free ends in a pressure transmitting disk arranged transversely relative to the direction of force. One end of the LWL is acted upon in a simultaneously or sequentially alternating manner by two monochromatic light sources having different wavelengths. The two light waves exiting at the other end of the light waveguide are divided into the two modes via a polarizing beam splitter and detected by photoelectrical means, and the pretensioning force in the structural component part is determined by means of phase comparison via a calibrated evaluating logic with intermediate storage of the individual measurement values.

The other method, according to the invention, namely the socalled compensation method for the measurement of force by fiber optics based on the strain-induced change in birefringence of a single-mode light waveguide, is characterized in that, in order to achieve unequivocal measurements. i.e. absolute measurement, polarized white light is beamed into one end of the light waveguide and the phase or path difference of the two linear modes of the light waves exiting at the other end of the light waveguide caused by the force acting on the light waveguide and the consequent change in birefringence is compensated for by a Michelson interferometer comprising an electronically adjustable mirror arrangement and provided with a polarizing beam splitter connected upstream for dividing the modes and comprises λ/4 plates at its outputs.

Advantageous further developments of, and additions to, the two measurement principles, according to the invention, with two light beams having different wavelengths on the one hand and with noncoherent light, preferably white light, on the other hand are indicated in the claims and/or explained in the following description with reference to the drawings, also with respect to advantageous particulars.

DETAILED DESCRIPTION OF THE PREFERRED EMBODIMENTS

First the inventive idea of a serial measurement of the pretensioning force in a highly loaded mechanical structural component element with the use of two light wavelengths according to the first fundamental embodiment variant of the invention is explained with reference to a typical example of application in a heavy-duty dowel.

The aforementioned FIG. 1 shows a dowel or expansion bolt D which is inserted in masonry 6 and can be tightened at a screw head by means of a fastening moment Mt, the expansion claws 2 being pressed outward into the masonry 6 via the thread 1 in a known manner, so that a pretensioning force N is generated in the dowel 3 and transmitted via a washer 3 to a structural component part 17 to be fastened onto the masonry 6.

The invention provides a light waveguide fiber 4, i.e. the LWL, embedded in the washer 3 along a partial area 4' of its length so as to enable the measuring of the pretensioning force (compare FIGS. 2 to 5 and 10). Since the LWL 4 alone cannot absorb the typical pretensioning forces of e.g. 10 to 30 kN distributed along a loop length of the clamped partial area 4' of 60 mm, the washer 3 must be modified in such a way that the LWL 4 embedded therein need only withstand the corresponding surface fraction and is protected from overloading and corrosion on the other hand by the shell or casing. Various methods are suitable for this embedding, e.g. soldering, galvanization, gluing, flame-spraying, and sintering, as are various embedding materials, particularly composite work materials, metals, metallic solder, particularly glass solder. It is important in this embedding process that the transformation point of the LWL 4 (typically 900° C.) not be exceeded and that the LWL 4 not be mechanically overloaded. Moreover, the embedding must be elastic, i.e. there may be no evidence of creep or hysteresis behavior; it must be homogeneous and the modulus of elasticity of the utilized embedding material or materials and their constants must be adapted to the thermal expansion coefficients of the LWL 4 and of the metallic material of the washer 3 which is described in more detail in the following. Glass solder of glass types 8472 and 8474 by the firm SCHOTT and Erosil-filled polymethacrylate (cold-hardening, heat-hardening or UV-hardening) by the firm Ivoclar (Isopast ®s, SR-Isosit ®, Heliomolar ®) have proven to be well-suited materials for the embedding material.

Figure 3:
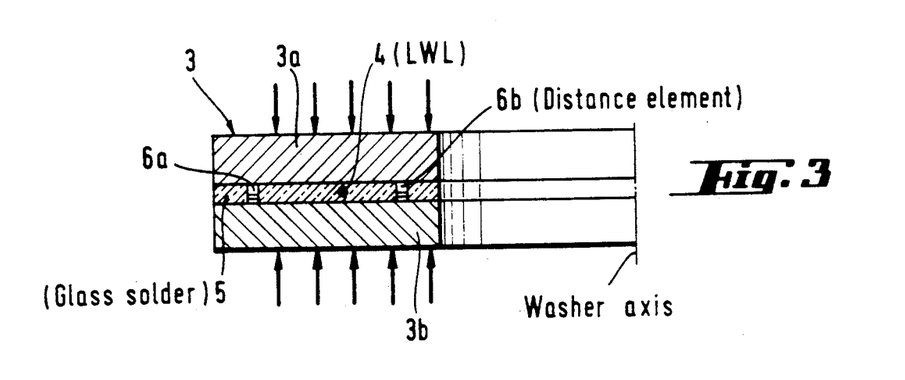
FIG. 3 shows an embodiment example for the installation of a LWL in a force transmitting disk.

FIG. 3 illustrates the construction of a washer 3 comprising two individual annular disks or washers $3a$ and $3b$ of metal, the partial area 4' of the LWL 4 being embedded in glass solder 5 between the disks. Two distance or spacer rings $6a$ and $6b$ are provided for additional protection against overloading.

The pretensioning force N acting between the two annular disks $3a$, $3b$ causes, among other things, two different tension components in the center of the light waveguide fiber of the LWL 4, i.e. one parallel and the other vertical to the pressure on the fiber. A birefringent medium occurs as a result of the elasto-optical properties of the light waveguide fiber 4, i.e. there is a phase displacement between the polarized light parallel to and vertical to the pressure, which light passes through the fiber 4. This phase displacement is a direct gauge for the force acting on the washer 3.

The phase displacement is generally a multiple of $2\pi$. The pretensioning force N can therefore be determined simply by counting the periodic change in polarization during a loading process. However, this method fails in subsequent measurements of the pretensioning, since the results of the strain-induced birefringence which can be evaluated are ambiguous modulo $2\pi$. This difficulty can be overcome by measuring the phase displacement of two light beams with two different wavelengths according to the invention. The number of $2\pi$ periods can be determined in an unequivocal manner within a predetermined measurement range by means of comparing the two measurement results.

Figure 4:
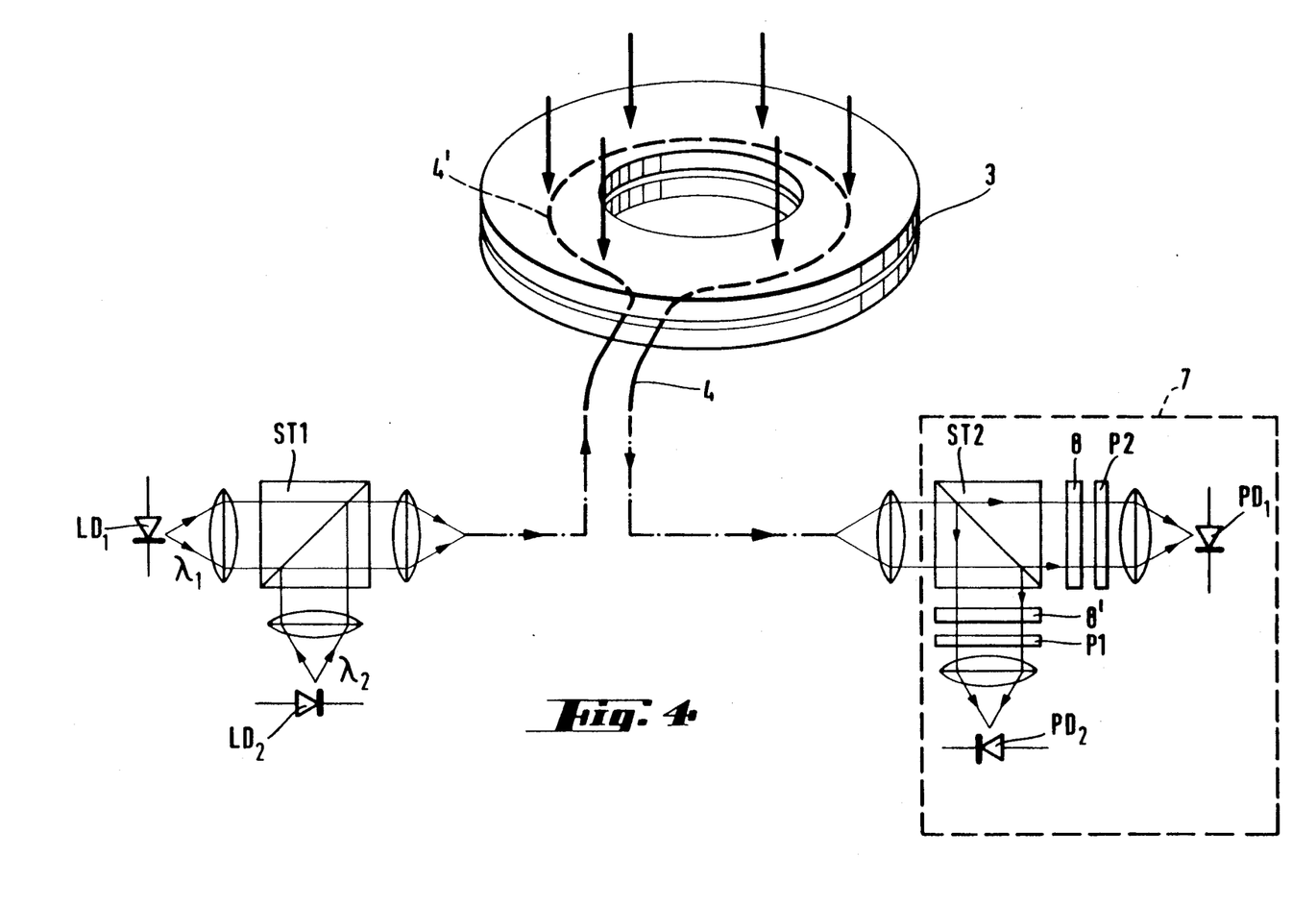
FIG. 4 shows the construction of an optical fiber force measurement device which is based upon the first two-wavelength method for the measurement of force, according to the invention, with evaluation according to the so-called quadrature method.

FIG. 4 shows a first embodiment example for the principle of the construction of a device for implementing the first two-light beam measurement method, according to the invention, according to the so-called quadrature method. Monochromatic light with two different wavelengths $\lambda_1$ and $\lambda_2$ is beamed into the optical fiber force sensor at the free end of the LWL 4 on the left-hand side as described above. The free end of the LWL 4 on the right-hand side sends the exiting light to a detector unit 7 for analysis of the polarization of the originally linearly polarized light after passing the birefringent, embedded partial area 4' of the LWL 4. In the shown embodiment example, the light source substantially consists of two single-mode infrared laser diodes $LD_1$ and $LD_2$, which deliver light with wavelengths of 800 nm with a wavelength difference of approximately 10 nm, regardless of the desired absolute force measurement region. A range of approximately 5-20 nm is suitable, preferably 10-15 nm. In order to keep these wavelengths constant, both the temperature and the conducting current of the laser diodes $LD_1$, $LD_2$ should be regulated. For example, a periodic switching back and forth between the two laser diodes $LD_1$, $LD_2$ or an intensity modulation of the two laser diodes $LD_1$, $LD_2$ at different frequencies is effected by means of known electronics (not shown). Since the laser diodes generate polarized light, a simple collimator construction with a beam splitter ST1, illustrated by two schematically shown lenses, is sufficient for coupling defined polarized light into the single-mode LWL 4 of the force sensor, particularly at a 45-degree tilt relative to the optical axis, i.e. the tension axis of the birefringent component.

In addition to a collimator construction, again indicated only in a schematic manner, the detector unit 7 comprises a second beam splitter ST2 for dividing the two modes. A $\lambda/4$ plate 8 and a polarizer P2 are arranged downstream of one output of the second beam splitter ST2 before the one intensity component (the one mode) arrives at a first photodetector $PD_1$. The second output of the second beam splitter ST2 acts on a second photodetector $PD_2$ via another $\lambda/4$ plate 8' and another polarizer P1. The pretensioning force acting in the mechanical structural component part can be determined according to the so-called quadrature method with this construction of the detector unit 7, as will be discussed in more detail in the following and as is described in the references [1] and [4].

Figure 5:
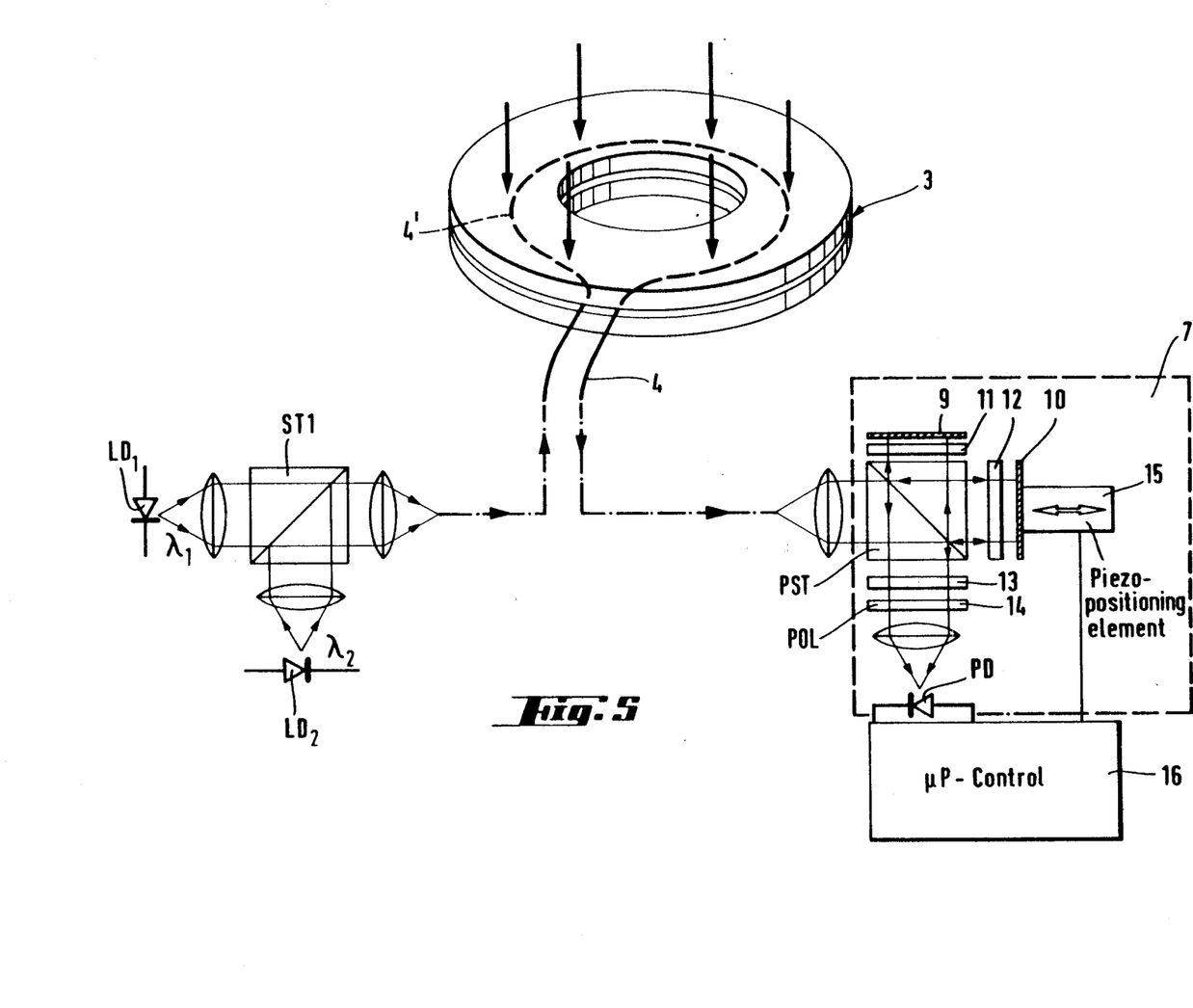
FIG. 5 shows the construction for another embodiment form of an optical fiber force measurement device which is based upon the first two-wavelength measuring method, according to the invention, for the measurement of force with evaluation according to the so-called phase displacement method.

In the construction of a force measurement arrangement according to FIG. 5, which is suitable for the measurement of force with the phase shifting method, the detector unit 7' corresponds to a modified Michelson interferometer. For reasons discussed in the following, $\lambda/4$ plates 11, 12 are arranged between a polarized beam splitter PST and mirrors 9, 10. The output of the interferometer acts on a photodetector, e.g. a photodiode PD, via another $\lambda/4$ plate 13 and another polarizer 14. One mirror 10 is displaceable vertically relative to its mirror surface around path elements, which can be pre-set and correspond to a determined phase displacement, by means of a piezo-adjusting element 15 whose control signals are predetermined by means of a control unit 16 realized e.g. by a microprocessor.

The pretensioning force can be determined according to the quadrature method on the one hand (see references [1] and [4]) or by the phase step method (reference [5]) with the two measurement constructions described with reference to FIGS. 4 and 5.

The quadrature method, as applied to the invention, is discussed first:

The light exiting the light waveguide 4 and arriving on the detector unit 7 is divided by the beam splitter ST2 into two light beams of identical intensity. The two light beams then pass through one of the $\lambda/4$ plates 8 or 8', respectively, and one of the polarizers P2 or P1, respectively. The position of the $\lambda/4$ plates 8, 8' and the polarizers P1, P2 is selected in such a way that the first diode $PD_1$ detects a cosine-shaped phase displacement signal and the other $PD_2$ detects a sine-shaped phase displacement signal. The diode signals are thus given by $$I_1 = I_0(1+\cos\delta) \text{ and } I_2 = I_0(1+\sin\delta) \qquad (1).$$

The phase $\delta$ can be determined from this as $$\tan\delta = (I_2 - I_0)/(I_1 - I_0) \qquad (2).$$

It is advisable to determine $I_0$ separately, to digitize all three signals and to solve equation (2) in a microprocessor.

The quadrature method presupposes ideal optical characteristics of the $\lambda/4$ plates 8, 8' and polarizers P1, P2. Since such structural component elements are often not available or are extremely expensive, the phase step method (compare reference [5]) was found; it provides good values for the phase displacement also with non-ideal components. A non-ideal signal is described by $$I = a(1 = m \cos\delta) \qquad (3).$$

wherein a designates an average intensity and m designates the modulation factor. Thus, at least three independent measurement signals are needed to solve this equation with respect to phase $\delta$. As is shown in FIG. 5, it is more advantageous to work with a single photodiode PD, but also to use a phase displacement unit comprising the mirrors connected with the piezo-adjusting element 15, so that independent measurement signals can be obtained. The formulation of equation (3) then changes to $$I_i = a(1 + m \cos(\delta + \Phi_i)) \qquad (4).$$

For example, when four phase displacements with $\Phi_i = 0, \pi/2, \pi, 3\pi/2$ are selected, the desired phase displacement $\delta$ can be determined by evaluation by means of the equation $$\tan\delta = (I_3 - I_1)/(I_2 - I_4) \qquad (5).$$

The necessary fixed phase displacements $\Phi_i$ can be realized by the modified Michelson interferometer construction discussed above, as is shown in FIG. 5. The light beams which are polarized orthogonally relative to one another accordingly take different paths as they leave the light waveguide 4 and reunite on the photodiode PD only after the polarizer POL. As a result of the defined displacement of one of the mirrors 9, 10—mirror 10 in the shown example—with the electrically controlled piezo-adjusting element 15, the desired phase displacement between these beams can be realized. The use of a microprocessor 16 for predetermining the electrical signals for the positioning of the mirror 10 and for the further processing of the digitized diode signals is again advantageous.

It will be shown briefly in the following how the pretensioning force is calculated:

A phase displacement $\delta_1$ or $\delta_2$ corresponding to modulo $2\pi$ of the phase displacement which was induced by the mechanical strain in the LWL 4 can be determined for a wavelength $\lambda_1$ or $\lambda_2$. Based on the knowledge of these two phase displacements and given that N is equal in both cases, the quantity N of $2\pi$ periods is $$N = 1/2\pi(\delta_1\lambda_1 - \delta_2\lambda_2)/(\lambda_2 - \lambda_1) \quad (6).$$

From one of the two phase displacements and wavelengths the mechanical strain is then given by $$\sigma = 1/\pi(q_{12} - q_{11})^{-1} \lambda \delta L^{-1} n^{-3} \quad (7),$$

wherein $q_{12}$, $q_{11}$ designate the piezo-optical constants whose differential for quartz glass is $q_{12} - q_{11} = 2.3 \cdot 10^{-12}$ Pa, L designates the length of the light waveguide and n designates the refraction coefficient of quartz glass which is free of strain.

In a typical application of an M16 dowel, the surface penetrated by mechanical strain is $1.5 \times 10^{-4}$ m² and the length 4' of the light waveguide in the washer is 0.06 m. Moreover, if semiconductor laser diodes having a light wavelength of 800 nm are used, the following equation applies for the pretensioning force (in N, $\delta$ in radians) for a refraction coefficient of n = 1.46 (quartz glass):

$$F = 87.0 \, \delta \quad (8).$$

The wavelength difference $\Delta\lambda$ must be adapted to the desired measurement range of the force $F_{max}$ by means of the equation $$\Delta\lambda = 0.683 \cdot 10^9 \lambda^2 / F_{max} \quad (9)$$

in order to determine N in an unequivocal manner. Accordingly, $\Delta\lambda$ is 14.6 nm for a measurement range of e.g. 30 kN. Clearly, this wavelength difference of more than 1% cannot currently be produced either by current modulation of the laser diode or by subsequent acousto-optical light modulation, i.e. two laser diodes with a wavelength difference in the indicated order of magnitude must actually be used, as is indicated in FIG. 4.

The second fundamental measurement principle according to the invention, which is discussed in the following, is based on the aforementioned compensation method.

Instead of operating with two wavelengths in order to determine two different phase values simultaneously or sequentially so as to eliminate the modulo $2\pi$ ambiguity, the alternative method based on a compensation principle is suggested with the invention.

Figure 6:
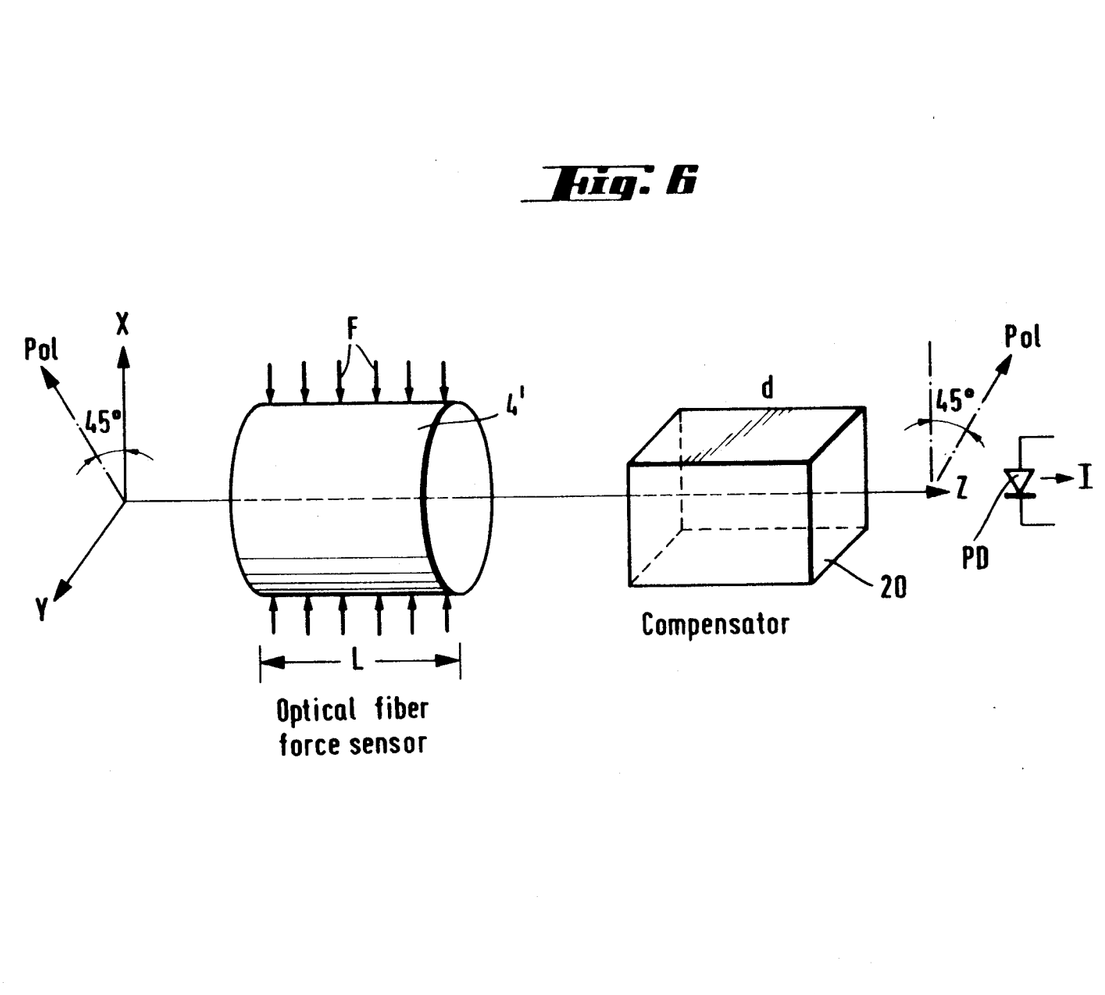
FIG. 6 shows a basic sketch explaining the second method according to the invention for the fiber-optic measurement of force with evaluation according to the so-called compensation principle.
Figure 10:
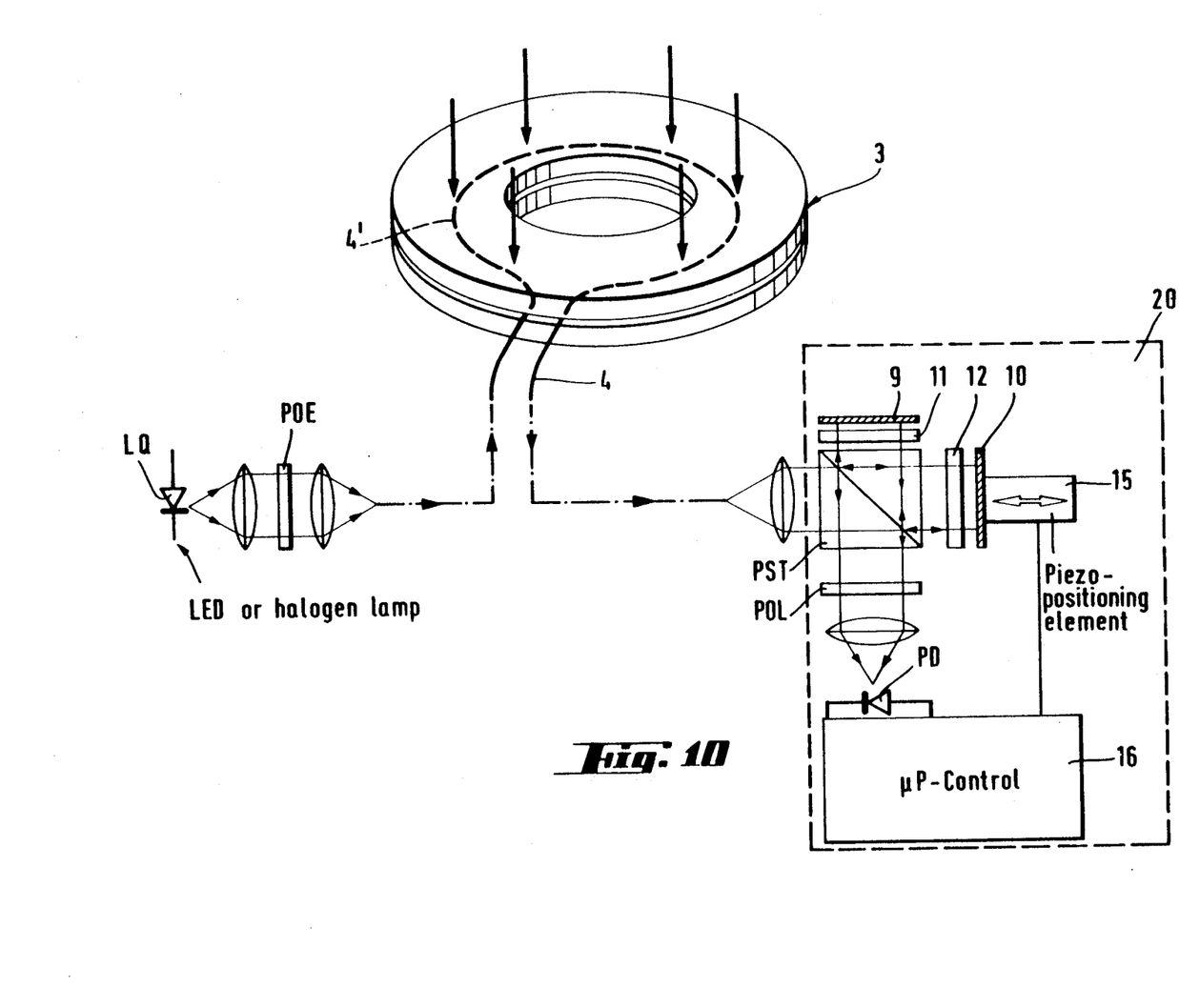
FIG. 10 shows the basic construction of an optical fiber force measurement device for the second method, according to the invention, with the use of white light and signal evaluation according to the compensation method.

FIG. 6 schematically illustrates the principle of this measurement method. FIG. 10 is referred to simultaneously with respect to the concrete measurement construction.

Noncoherent light of a light source LQ (e.g. LED or halogen lamp) passes through a polarizer POE on the input side and then arrives on the single-mode LWL 4, wherein the two chief components of the light are influenced in different manners in the LWL 4 in the area of the optical fiber force sensor on a length L (corresponding to 4'). The phase or path difference induced by the force F is canceled, i.e. compensated for, by an electronically controlled compensator 20. The control signal required for this in the compensator 20 is a direct measurement for the acting force. In principle, the phase shifting unit which has already been discussed with reference to FIG. 5 can serve as a compensator, i.e., e.g. a modified Michelson interferometer comprising a polarizing beam splitter PST, which divides the two differently polarized light waves, and two $\lambda/4$ plates 11, 12 which rotate the polarization direction by 90° after double passage (reflection on the mirrors 9 and 10), so that the two partial beams are superimposed in the polarizer POL and act upon the photodiode PD. The compensation of the path difference is effected by the microprocessor control unit 16 via the mirror 10 fastened at the piezo-adjusting element 15.

The phase displacement effected by the force F in the optical fiber force sensor is given by $$\delta_{LWL}(F) = \frac{2\pi}{\lambda} L \Delta n(F) \quad (10.)$$

The following equation applies for the phase difference to be compensated for by the compensator 20 by means of path displacement of the mirror 10 by an amount $d/2$:

$$\delta_K = \frac{2\pi}{\lambda} \cdot d. \quad (11)$$

The following equation applies to the intensity signal at the photodiode PD for a fixed wavelength $\lambda$:

$$I = \frac{I_o}{2} \left\{ 1 - q(|d(F) - d|) \cdot \cos \frac{2\pi}{\lambda} (d(F) - d) \right\}. \quad (12)$$

In this equation, q designates a coherence function which is dependent on the path difference (phase difference) of the two light waves having different polarization. The following equation applies:

$$q = e^{-(\frac{d(F) - d}{l_{koh}})^2 \ln 2}. \quad (13)$$

$l_{koh}$ designates the coherence length which is given by $$l_{koh} = \frac{\lambda^2}{\Delta\lambda}, \quad (14)$$

wherein $\Delta\lambda$ designates the spectral width of the light source.

The coherence function q according to equation (13) shows a Gaussian distribution.

When the spectral distribution of the light source $g(\lambda)$, the spectral sensitivity of the detector $\eta(\lambda)$, and the Gaussian distribution of the coherence function q are taken into account, the following equation applies:

$$I = \frac{I_0}{2}\left(1 + q\left(\frac{\int_0^\infty d\lambda g(\lambda)\eta(\lambda)\left(1 - \left(\cos\frac{2\pi}{\lambda} L\Delta n(F) - d\right)\right)}{\int_0^\infty d\lambda g(\lambda)\eta(\lambda)} - 1\right)\right). \quad (15)$$

Figure 7:
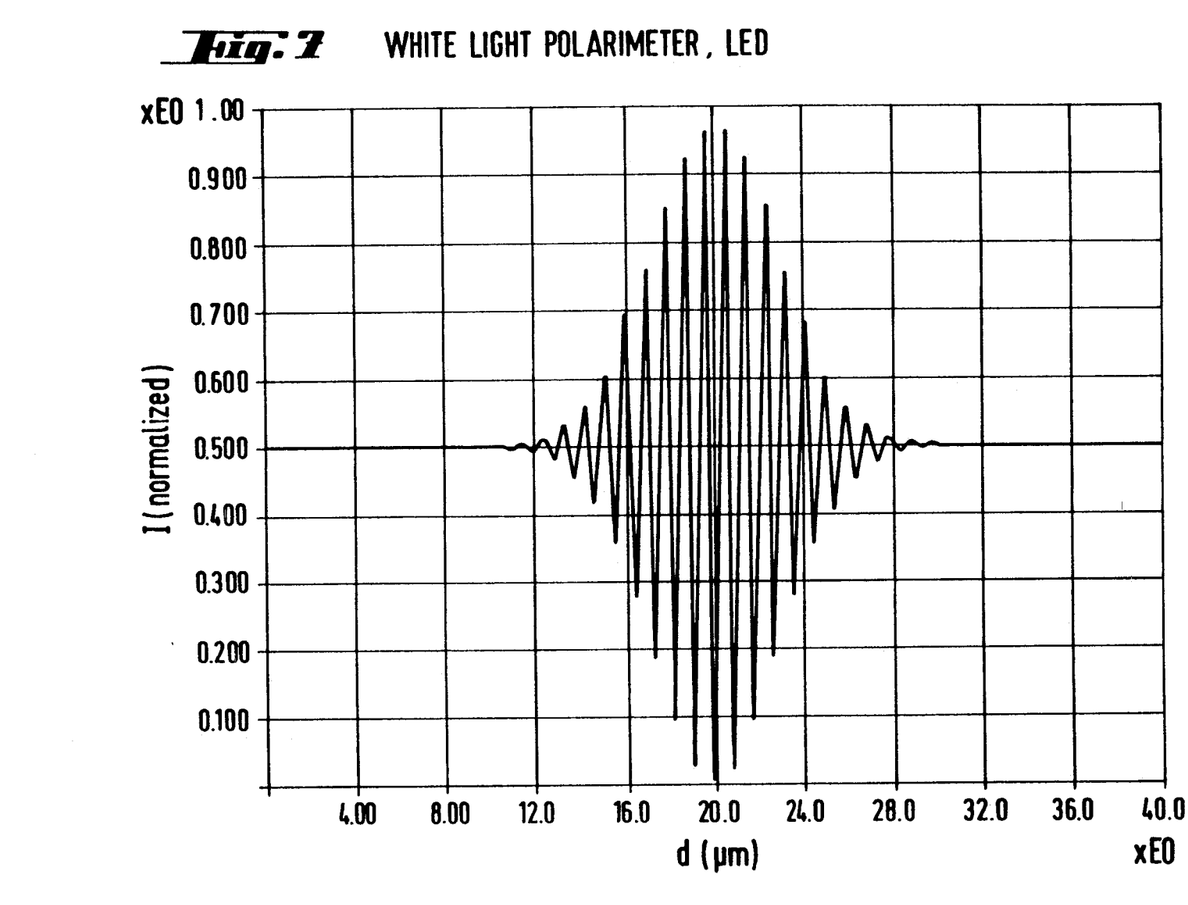
FIG. 7 shows the calculated curve of the spectrum within the coherence length of a white-light source with the use of a light emitting diode and application of the compensation method according to the second embodiment variant of the invention.
Figure 8:
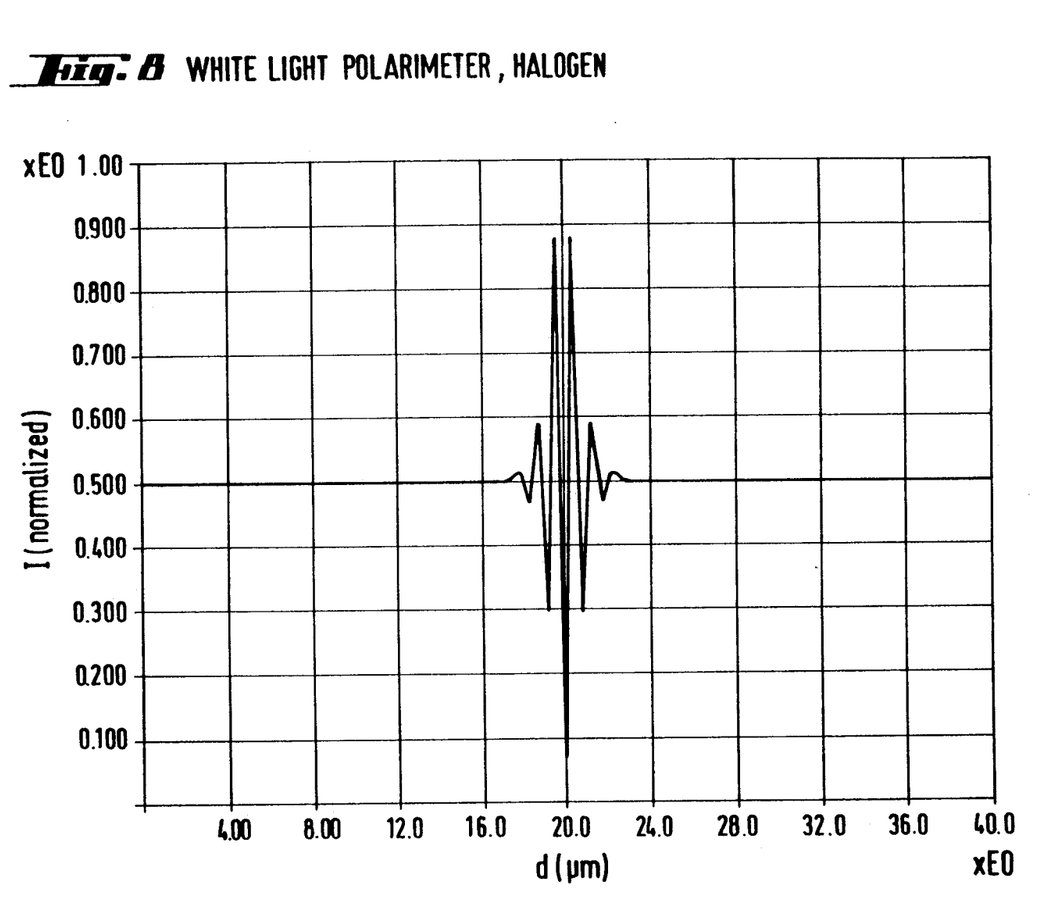
FIG. 8 shows a spectral diagram corresponding to FIG. 7 with the use of a halogen lamp as light source with the application of the compensation method according to the invention.

FIGS. 7 and 8 show calculated curves for the intensity when using a LED (FIG. 7) on the one hand and a halogen lamp (FIG. 8) on the other hand, wherein the respective spectrum of the light sources with their coherence lengths (LED 8 μm; halogen lamp 1.5 μm) and the spectral sensitivity of the photodiode PD were taken into account. In both cases, the photodiode signal is plotted in normalized units against the path displacement of the mirror 10. Particularly with the halogen light source (FIG. 8), a pronounced minimum is detected at the location where the path or phase difference in the LWL 4 is canceled by appropiate adjustment of the mirror 10 in the compensator 20. The envelope curve of the "decaying" oscillations depends on the spectral width $\Delta\lambda$ and the coherence length $l_{koh}$ of the respective light source.

The phase displacement induced by the force in the loaded structural component element, i.e. in the LWL 4, is canceled (compensated for) by an electronically controllable compensator element - the piezo-adjusting element 15 in the embodiment example shown in FIG. 10. The control signal needed for this is therefore a direct measurement for the acting force.

The following easily derivable equation in turn applies for the typical application in a M16 dowel with the previously used parameters:

$$F(kN) = 1.36\, d_{min}(\mu m) \quad (16).$$

Figure 9:
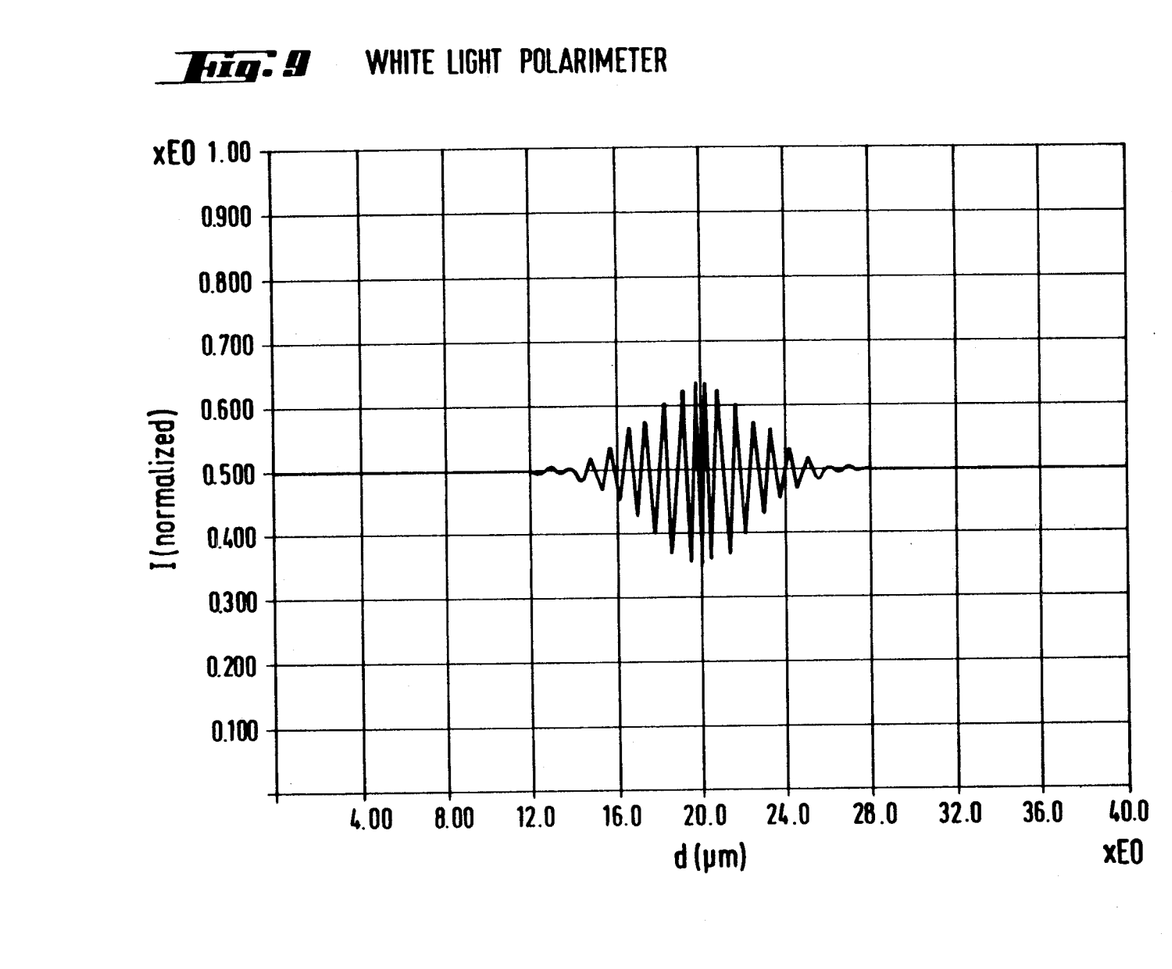
FIG. 9 shows the measurement curves corresponding to FIGS. 7 and 8 in which non-ideal components of the measurement construction lead to incomplete through-modulation.

FIG. 9 shows an actual measurement curve with the use of halogen light as a noncoherent light source LQ (white-light source). Similar to the calculated curves according to FIGS. 7 and 8, the minimum is distinctly pronounced, although the curve really measured shows an incomplete through-modulation because of the non-ideal components.

With respect to accuracy and reproducibility of the measurement results, the phase step method described above and the compensation method described last are approximately identical. For practical application and economy, however, the compensation method has the decisive advantage that no monochromatic light sources are required; rather, a simple white light source, e.g. a light emitting diode (LED) or a low-voltage halogen lamp, can be used.

While the invention has been described in connection with preferred embodiments, it will be understood that modifications thereof within the principles outlined above will be evident to those skilled in the art and thus the invention is not limited to the preferred embodiments but is intended to encompass such modifications.

APPENDIX

References:

[1]: A. Bertholds, Thesis, 1987 "Elastic and photoelastic properties of single-mode optical fibers: application to the measurement of force".

[2]: A. Bertholds and R. Dändliker, Applied Optics 25, 340-343 (1986), "High-resolution photoelastic pressure sensor using low-birefrigence [sic] fiber"

[3]: A. Bertholds and R. Dändliker, Journal of Lightwave Technology, 6, 17-20 (1988) "Determination of the Individual Strain-Optic Coefficients in Single-Mode Optical Fibers"

[4]: A. Bertholds and R. Dändliker, Electronics Letters, 21, 65-67 (1985), "MICROPROCESSOR-BASED PHASE DETERMINATION FOR HIGH-RESOLUTION OPTICAL SENSORS"

[5]: R. Thalmann, Holografietagung 6/28,29/88, HDT, Essen "Grundlagen zur rechnergestützten Auswertung holografischer Interferogramme" [Foundations for the computer-supported evaluation of holograph interferograms]

We claim:

1. A method for the absolute measurement of a force by fiber optics, based on the straininduced change in birefringence of a single-mode light waveguide wherein, in order to achieve unequivocal measurement results for said force:

two light waves having different wavelengths are beamed into one end of a light waveguide and the difference phase shifts of the two linear modes of said light exiting at an opposite end of said light waveguide, which is caused by the influence of force on said light waveguide and the consequent change in birefringence are detected photoelectrically, wherein the absolute values of said phase shifts are determined by means of phase comparison via a calibrated evaluating logic with an intermediate storage of said individual measurement values of said detected phase shifts, and further wherein said determined absolute value of at least one of said phase shifts is evaluated as a measurement for said force.

2. The method of claim 1 for a strain-induced measurement of an absolute value of a pretensioning of a mechanical structural component part under at least one of compressive and tensile loading, wherein:

said light waveguide is embedded in a pressure-tight casing along a partial area of its length in a plane vertical to a pretensioning force between disks distributing along its surface said pretensioning force;

and further wherein said two light waves exiting at said opposite end of said light waveguide are divided into their two modes via a polarizing beam splitter.

3. The method of claim 1, wherein the difference of the wavelengths of said two light waves is selected in adaptation to a desired measurement range of said force.

4. The method of claim 1, wherein said two light waves which have different wavelengths are beamed into said light waveguide simultaneously with intensity modulation of light sources at different frequencies.

5. A device for the fiber-optic measurement of the absolute value of a pretensioning in a mechanical structural component part which is highly loaded by one of tensile and compressive forces, which comprises:

means for embedding a fiber-optic light waveguide in a pressure transmitting disk arranged transversely relative to a direction of force along a partial area of its length lying between its free ends;

two monochromatic light sources having different wavelengths;

means for introducing into one end of said light waveguide, in one of a simultaneously and a sequentially alternating manner, light waves from said light sources;

means for determining separately at an opposite end of said waveguide said two light waves having different wavelengths and converting same to electrical signals;

a phase comparison circuit and evaluating logic for determining the number of $2\pi$ periods of phase shifts of at least one of said wavelengths and calculating the absolute value of one of said tensile and compressive forces from said determined absolute value of said phase shift; and means for feeding said electrical signals to said phase comparison circuit and evaluating logic.

6. The device of claim 5, which further comprises:

a beam splitter and a collimator device between said two light sources and said light waveguide wherein said beam splitter is arranged in such a way that defined polarized light beams are coupled into said light waveguide.

7. The device of claim 6, wherein said beam splitter is designed and arranged in such a way that said polarized light beams are coupled into said light waveguide at a 45-degree tilt relative to an optical axis of a birefringent component.

8. The device of claim 5, which further comprises:

a polarizing beam splitter and assigned photodetector;

means for respectively coupling to said photodetector the two modes of said light waves exiting at an opposite end of said light waveguide via said beam splitter and $\lambda/4$ plates and a polarizer provided downstream of said light waveguide; and means for evaluating according to a quadrature method a phase differential and calculation of the pretensioning force following from the latter.

9. The device of claim 5, which further comprises:

downstream of said light waveguide, a polarizing beam splitter;

$\lambda/4$ plates;

a Michelson interferometer which further comprises:

mirrors;

a polarizer; and a photodetector, wherein said two modes of said light waves exiting at said opposite end of said light waveguide being divided via said polarizing beam splitter and, after passing through a $\lambda/4$ plate, reflected at said mirrors of said Michelson interferometer and, after passing through said polarizer, jointly acting upon said photodetector, means for adjusting the position of one mirror by defined fixed amounts vertically relative to the mirror surface in order to change a phase differential between said two light beams, so that said phase differential and said pretensioning force following from the latter can be determined according to a phase shift method while taking into account of differences and fluctuations in the intensity of said light sources and fluctuations of the modulation factor on the basis of a plurality of determined measurement values.

10. The device of claim 5, wherein said light sources are single-mode infrared laser diodes.

11. The device of claim 10, wherein wavelengths of said light waves emitted by said laser diodes lie in the region of 800 nm and differ from one another by approximately 5 to 20 nm.

12. The device of claim 10, wherein said wavelengths of said light waves emitted by said laser diodes lie in the region of 800 nm and differ from one another by approximately 10 to 15 nm.

13. A method for the absolute measurement of force by fiber optics, based on the strain-induced change in birefringence of a single-mode light waveguide, wherein, in order to achieve unequivocal measurement results;

polarized noncoherent light is beamed into one end of a light waveguide and a phase difference of two linear modes of light waves exiting at an opposite end of said light waveguide caused by the influence of force on said light waveguide and a consequent change in birefringence is compensated for by means of a control signal, and wherein said control signal required for the compensation is evaluated as a measurement for said force.

14. The method of claim 13, wherein said noncoherent light is white light.

15. The method of claim 13 wherein said light waveguide is embedded in a pressure-tight casing along a partial area of its length in a plane vertical to a pretensioning force between disks distributing said pretensioning force along its surface.

16. A device for fiber-optic measurement of the absolute value of a pretensioning in a mechanical structural component part which is highly loaded by tensile or compressive forces, which comprises:

an optical fiber coupled to said component part;

a light source for introducing a light beam into one end of said fiber;

a Michelson interferometer, which further comprises an electronically adjustable mirror arrangement and provided with a polarizing beam splitter for mode division with a $\lambda/4$ plates at its outputs, is arranged for receiving said light beam exiting from said optical fiber for phase compensation of its two components;

means for evaluating a control signal effecting a mirror adjustment for the compensation of a phase difference as a measurement for said force.

17. The device of claim 16, wherein a partial area of said light waveguide is embedded in a pressure-tight substance between two metallic disks which are arranged in a plane-parallel manner.

18. The device of claim 16, wherein said light waveguide is enclosed by a spacer element incorporated in said pressure-tight substance.

19. The device of claim 16, wherein said pressure-tight substance is fusible at a melting point lying below the transformation point of the light waveguide material.

20. The device of claim 18, wherein said pressure-tight substance is a glass solder.

21. The device of claim 17, wherein said pressure-tight substance is a plastics material with a high proportion of filler material which may be one of aluminum oxide and quartz and Erosil and silicon carbide and the like which is curable by one of cold and heat and UV rays.

22. The device of claim 5, wherein said mechanical structural component part is a heavy-duty dowel, and further wherein said disk 3 in which said partial area of said light waveguide is embedded is constructed in the form of a pressure distributing washer.

23. The device of claim 16, wherein said mechanical structural component part is a heavy-duty dowel, and further wherein said disk 3 in which said partial area of said light waveguide is embedded is constructed in the form of a pressure distributing washer.

24. The method of claim 1, wherein the difference of the wavelengths of said two light waves is selected in adaptation to a desired measurement range of said force.

* * * * *